(12) United States Patent
August

(10) Patent No.: US 6,659,396 B1
(45) Date of Patent: Dec. 9, 2003

(54) ARCH WING AND FORWARD STEERING FOR AN ADVANCED AIR VEHICLE

(75) Inventor: Henry August, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/200,692

(22) Filed: Jul. 22, 2002

(51) Int. Cl.[7] ................................. B64C 3/38
(52) U.S. Cl. ..................................... 244/45 R
(58) Field of Search ............... 244/45 R, 113, 244/75 R, 120

(56) References Cited

U.S. PATENT DOCUMENTS

| | | | | |
|---|---|---|---|---|
| 1,613,091 A | * | 1/1927 | Francis | 244/45 R |
| 1,696,493 A | * | 12/1928 | Lenert | 244/45 R |
| 3,804,428 A | * | 4/1974 | Amick | 280/8 |
| 3,834,654 A | * | 9/1974 | Miranda | 244/13 |
| 3,981,460 A | * | 9/1976 | Ratony | 244/13 |
| 4,053,125 A | * | 10/1977 | Ratony | 244/46 |
| 4,146,199 A | * | 3/1979 | Wenzel | 244/45 R |
| 4,365,773 A | * | 12/1982 | Wolkovitch | 244/45 R |
| 4,739,957 A | * | 4/1988 | Vess et al. | 244/199 |
| 4,746,081 A | * | 5/1988 | Mazzoni | 244/89 |
| 4,809,929 A | | 3/1989 | August | |
| D311,720 S | * | 10/1990 | Butler | D12/331 |
| 5,078,069 A | | 1/1992 | August et al. | |
| 5,149,906 A | | 9/1992 | August | |
| 5,279,199 A | | 1/1994 | August | |
| 5,282,588 A | | 2/1994 | August | |
| 5,368,255 A | | 11/1994 | August | |
| 5,495,999 A | * | 3/1996 | Cymara | 244/45 A |
| 5,503,352 A | * | 4/1996 | Eger | 244/45 R |
| 5,537,909 A | | 7/1996 | Schneider et al. | |
| 5,685,504 A | | 11/1997 | Schneider et al. | |
| 5,899,409 A | * | 5/1999 | Frediani | 244/13 |
| 6,098,923 A | * | 8/2000 | Peters, Jr. | 244/45 R |
| 6,474,604 B1 | * | 11/2002 | Carlow | 244/199 |

OTHER PUBLICATIONS

Onera Information Brochure on Aerospace Research (2001–2002).

* cited by examiner

Primary Examiner—Charles T. Jordan
Assistant Examiner—Jordan M Lofdahl
(74) Attorney, Agent, or Firm—Harness Dickey & Pierce P.L.C.

(57) ABSTRACT

An air vehicle having an elongated body structure, which has an aft portion and an arch wing device that is coupled to the aft portion of the body structure. The arch wing device includes a lower wing, which has a swept back leading edge and a swept back trailing edge, an upper wing, which has a swept back leading edge and a swept back trailing edge, and a pair of interconnecting portions that couple each of the opposite outboard lateral edges of the upper wing to an associated outboard lateral edge of the lower wing.

14 Claims, 4 Drawing Sheets

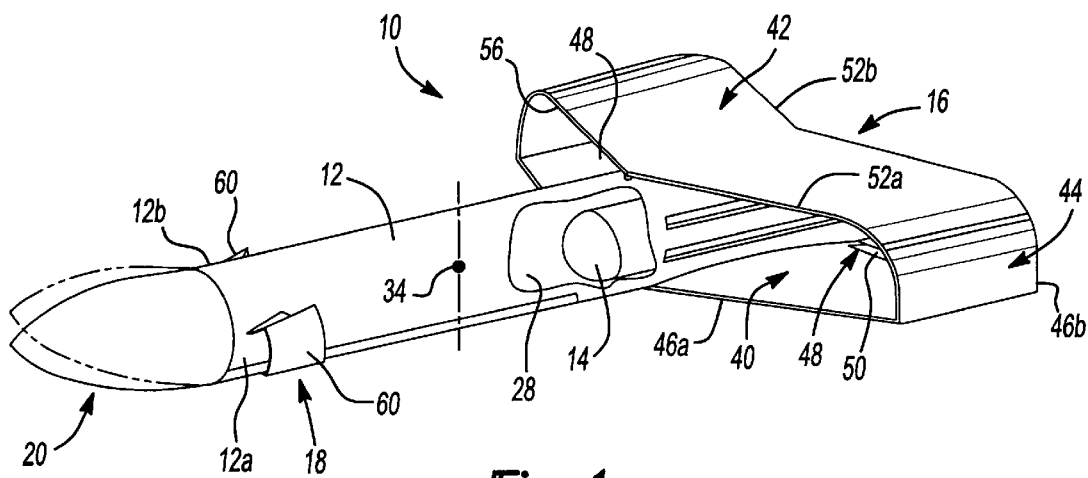
*Fig-1*
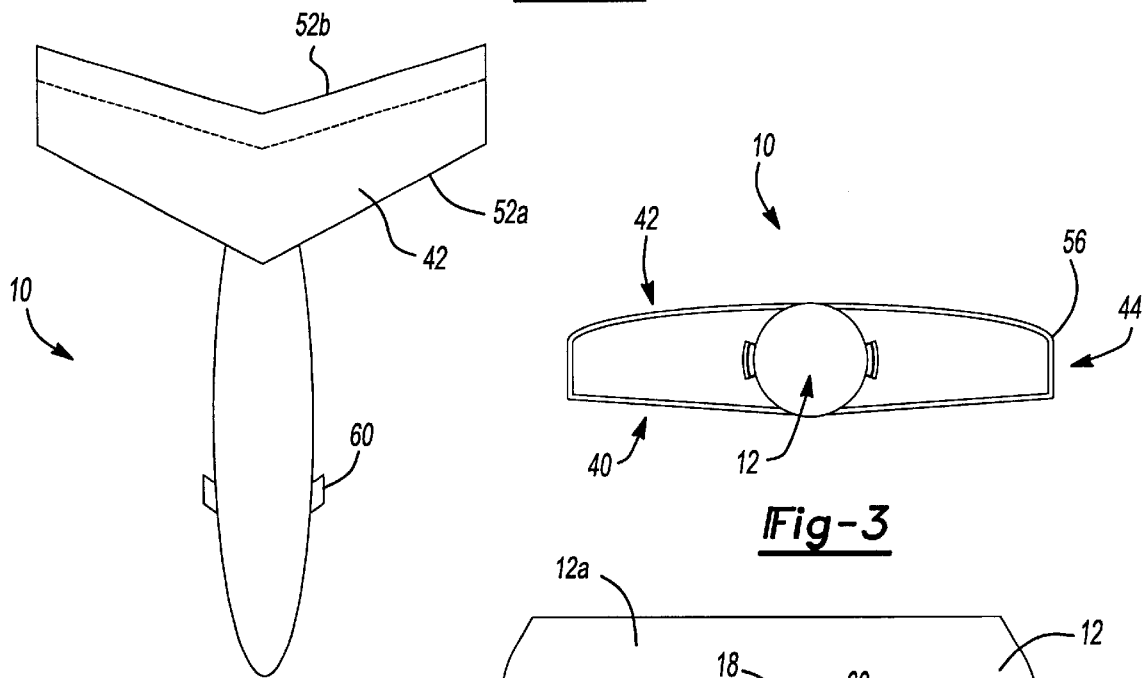
*Fig-2*
*Fig-3*
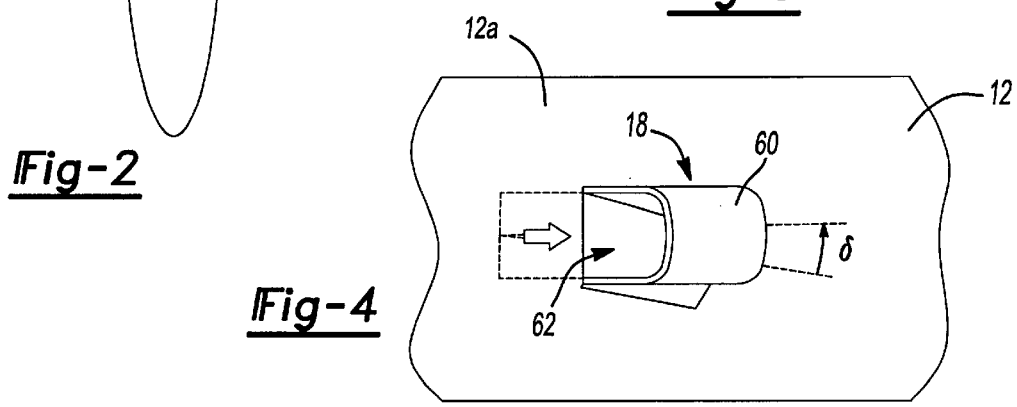
*Fig-4*

ARCH WING AND FORWARD STEERING FOR AN ADVANCED AIR VEHICLE

FIELD OF THE INVENTION

The present invention generally relates advanced air vehicles and more particularly to an air vehicle that utilizes an arch wing configuration.

BACKGROUND OF THE INVENTION

There remains a need in the art for an improved air vehicle that may be readily utilized for applications including unmanned combat air vehicles, reusable launch vehicles, hypersonic aircraft and rapid response air vehicles. More specifically, there remains a need in the art for an air vehicle that is both highly efficient and maneuverable during its operation at hypersonic speeds.

SUMMARY OF THE INVENTION

In one preferred form, the present invention provides an air vehicle having an elongated body structure, which has an aft portion and an arch wing device that is coupled to the aft portion of the body structure. The arch wing device includes a lower wing, which has a swept back leading edge and a swept back trailing edge, an upper wing, which has a swept back leading edge and a swept back trailing edge, and a pair of interconnecting portions that couple each of the opposite outboard lateral edges of the upper wing to an associated outboard lateral edge of the lower wing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 1 is a perspective view of an air vehicle constructed in accordance with the teachings of the present invention;

FIG. 2 is a top plan view of the air vehicle of FIG. 1;

FIG. 3 is a front elevation view of the air vehicle of FIG. 1;

FIG. 4 is a perspective view of a portion of the air vehicle of FIG. 1 illustrating the operation of the conformal steering device;

DETAILED DESCRIPTION OF THE PREFERRED EMBODIMENTS

Figure 5:
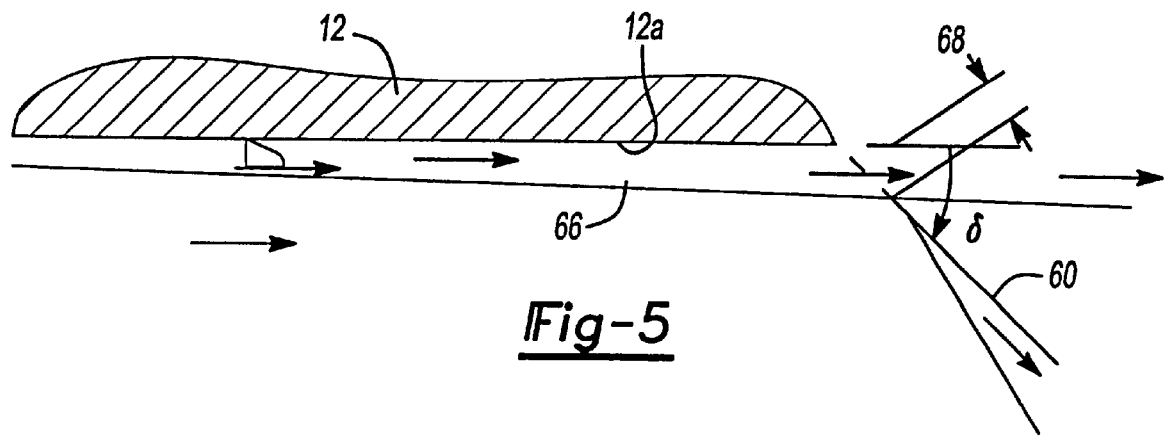
FIG. 5 is a schematic side view of a portion of the air vehicle of FIG. 1 illustrating the propagation of a boundary layer through the panels of the conformal steering device.

With reference to FIGS. 1 through 3 of the drawings, an air vehicle constructed in accordance with the teachings of the present invention is generally indicated by reference numeral 10. The air vehicle 10 is configured to be launched and boosted to a high altitude (e.g., 100,000 feet) and to attain hypersonic speeds (e.g., Mach 5 to 10). The air vehicle 10 is illustrated to include an elongated body structure or fuselage 12, a conventional engine 14, an arch wing assembly 16, a steering device 18 and a nose assembly 20. The fuselage 12 is shaped as a generally hollow cylinder that houses the engine 14. The fuselage 12 may be configured so as to receive an externally mounted payload, but more preferably, defines a payload compartment 28 for transporting a payload, such as GPS guided munitions (not shown). Although the air vehicle 10 is illustrated in the context of an advanced unmanned air vehicle for combat, those skilled in the art will appreciate that the invention, in its broader aspects, may be used in other applications, including reusable launch vehicles, hypersonic aircraft (such as fighters, bombers and reconnaissance craft) and rapid response air vehicles (e.g., hypersonic interceptors).

The arch wing assembly 16 is coupled to the rearward end of the fuselage 12, at a point that that is well aft of the center of gravity 34 of the air vehicle 10. The arch wing assembly 16 includes a lower wing 40, an upper wing 42 and a pair of interconnecting portions 44. The lower wing 40 is configured with a sweptback leading edge 46a and a sweptback trailing edge 46b. Preferably, the lower wing 40 includes a plurality of control surfaces 48, such as elevons 50, for affecting a vertical attitude of the air vehicle 10 when the air vehicle 10 is in flight. The upper wing 42 also includes a sweptback leading edge 52a and a sweptback trailing edge 52b. In the example provided, the lower and upper wings 40 and 42 are parallel one another and intersect the fuselage 12 in a tangential manner.

The interconnecting portions 44 act as vertical stabilizers and are oppositely positioned and serve to couple each outboard or distal end of the lower wing 40 to an associated distal end of the upper wing 42. In the embodiment illustrated, each interconnecting portion 44 includes an arcuate portion 56 that is coupled to the distal end of the upper wing 42 and bends outwardly and downwardly in an arcuate manner toward the lower wing 40. In the example provided, the interconnecting portion 44 intersects the distal end of the lower wing 40 at an angle of about 90°. Those skilled in the art will appreciate, however, that the intersection between the interconnecting portion 44 and the distal end of the lower wing 40 may be alternatively configured. For example, the interconnecting portion 44 may be configured to intersect the lower wing 40 at an acute angle or an obtuse angle, or in an arcuate manner that may or may not mirror the arcuate portion 56.

The steering device 18 is illustrated to include a conformal steering device 18 that is coupled to the fuselage 12 forwardly of the center of gravity 34. The conformal steering device 18 includes a pair of panels 60 that are coupled to the opposite sides 12a and 12b of the fuselage 12. With additional reference to FIG. 4, the panels 60 are illustrated to be coupled to the fuselage 12 such that they may be independently and selectively moved relative to the fuselage 12 to affect the lateral steering of the air vehicle 10 when the air vehicle 10 is in flight. In the example provided, the panels 60 are pivotably coupled to the fuselage 12 and moveable between an undeployed condition adjacent a respective side 12a or 12b of the fuselage 12 that does not affect the lateral steering of the air vehicle 10, and a deployed condition, wherein the panel 60 is pivoted outwardly from the fuselage 12 to affect the lateral steering of the air vehicle 10.

With specific reference to FIGS. 4 and 5, each of the panels 60 preferably includes an aperture 62 that is positioned adjacent the respective side (i.e., side 12a or 12b) of the fuselage 12 when the panel 60 is placed in the deployed condition. The aperture 62 is sized to permit a boundary layer 66 of air to propagate through the panel 60. More specifically, the aperture 62 is preferably sized to permit the formation of a gap 68 adjacent the side of the fuselage 12 wherein the size of the gap 68 is selected for the maximum boundary layer dimension estimated for a flight condition for the air vehicle 10. When the air vehicle 10 is operating in conditions that generate relatively thinner boundary layers, the air vehicle 10 achieves improved control effectiveness. Configuration of the conformal steering device 18 in this manner provides increased control effectiveness and reduces the heat load on the fuselage 12.

Returning to FIGS. 1 through 3, the nose assembly 20 is coupled to the fuselage 12 opposite the arch wing assembly 16. The nose assembly 20 is illustrated to have a 0° ogive nose, but may be configured with a bent-up ogive nose, such as a 5° or a 10° bent-up ogive nose. Furthermore, the nose assembly 20 may be movably coupled to the fuselage 12 so as to be movable through a predetermined range of angles, such as 0° bent-up to about 10° bent-up.

The arch wing assembly 16 provides the air vehicle 10 with relatively greater lift than other known wing types. The conformal steering device 18 is relatively more effective at high angles of attack and speeds (i.e., Mach numbers) than other known steering devices. The upbent nose assembly 20, particularly where it is movably coupled to the fuselage 12, provides a lifting component that aids in achieving self-trim in pitch. Accordingly, the arch wing assembly 16, conformal steering device 18 and nose assembly 20 cooperate to provide the air vehicle 10 with relatively greater maneuverability and range (or payload capacity), as well as the capability to land at relatively slower speeds.

Figure 6:
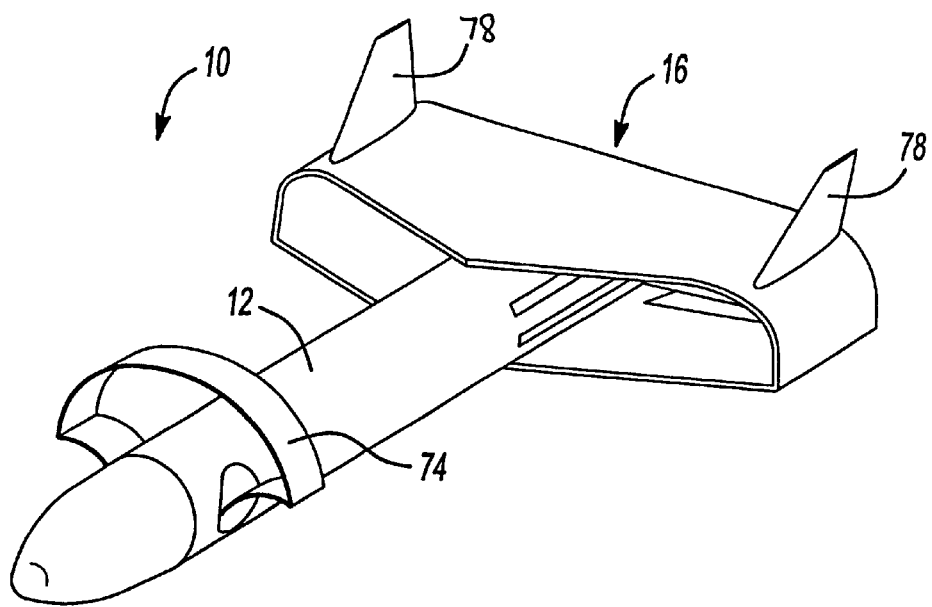
FIG. 6 is a perspective view of another air vehicle constructed in accordance with the teachings of the present invention.

Various other devices may be incorporated into the air vehicle 10 to improve its control effectiveness and/or aerodynamic efficiency. For example, FIG. 6 illustrates that a twistable ring canard 74 may be coupled to the fuselage 12 to affect the lateral steering, pitch and roll of the air vehicle 10. The ring canard 74 is preferably of the type that is deployed in-flight, but may also be permanently deployed. Additionally or alternatively, the air vehicle 10 may be equipped with twin verticals 78 which are incorporated into the arch wing assembly 16.

Figure 7:
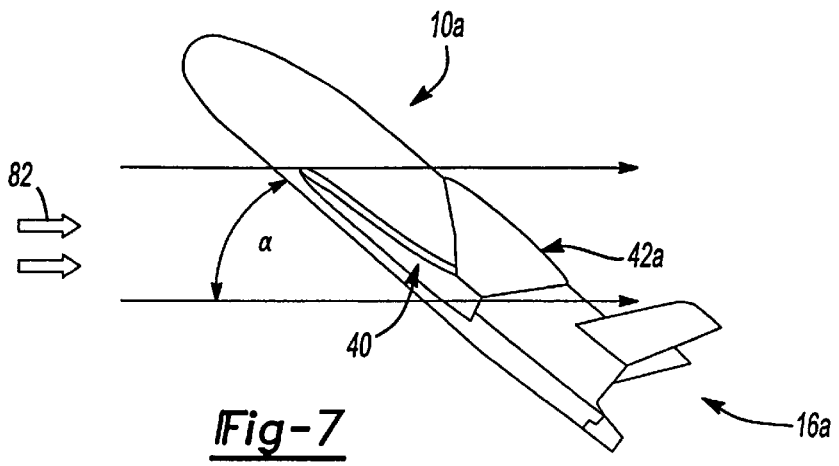
FIG. 7 is a perspective view of yet another air vehicle constructed in accordance with the teachings of the present invention.
Figure 8:
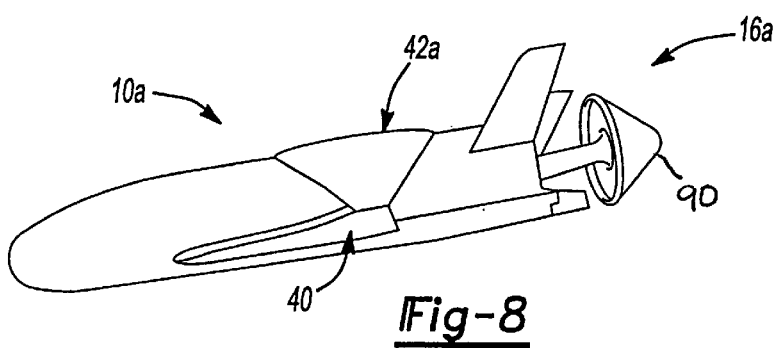
FIG. 8 is a side elevation view of the air vehicle of FIG. 7 illustrating the deployment of an inflatable tailcone.

While the above discussion of the air vehicle 10 has focused primarily on the operation of the air vehicle 10 in Earth's atmosphere, those skilled in the art will appreciate that the air vehicle 10 may be deployed on missions wherein the air vehicle exits and re-enters Earth's atmosphere. For such missions, the configuration of the air vehicle 10a as illustrated in FIGS. 7 and 8 may be advantageous. In FIG. 7, the air vehicle 10a is shown to include an arch wing assembly 16a that is configured in a manner that is generally similar to the arch wing assembly 16 (FIG. 1), except that the upper wing 42a is positioned further rearward relative to the lower wing 40 (in contrast, the upper wing 42 of the air vehicle 10 is positioned vertically above the lower wing 40) and the upper wing 42a is relatively narrower than the upper wing 42 (FIG. 1). As such, when the air vehicle 10a re-enters the Earth's atmosphere at hypersonic speeds and a high angle of attack ($\alpha$), for example about 40°, the arrangement of the arch wing assembly 16a using this Newtonian "line of sight" fashion permits the lower wing 40 to shield the upper wing 42a from the high energy flow 82. Accordingly, the upper wing 42a is protected from the high enthalpy airstream and the need for heavy and expensive thermal protection tiles (not specifically shown) can be avoided.

Subsequent to flying through the extreme thermal environment, the angle of attack can be lowered to about 10° where the improved aerodynamic qualities of the arch wing assembly 16a can be utilized. As illustrated in FIG. 8, an inflatable tailcone 90 may be deployed to reduce the base drag of the air vehicle 10a for extended entry flight range. The inflatable tailcone 90 may be deployed at a speed of about Mach 3.5 or lower and remain deployed as the speed of the air vehicle 10a reduces to subsonic speeds including landing conditions. Those skilled in the art will appreciate that the inflatable tailcone 90 may also be used in conjunction with the air vehicle 10, for example, to improve the flyback capability of the air vehicle 10 after the payload has been delivered. In this situation, the inflatable tailcone 90 is deployed after the speed of the air vehicle 10 has been reduced to a subsonic speed (e.g., at or below about Mach 0.7) to thereby increase the flyback range of the air vehicle 10 by about 10% to about 20%.

Figure 9:
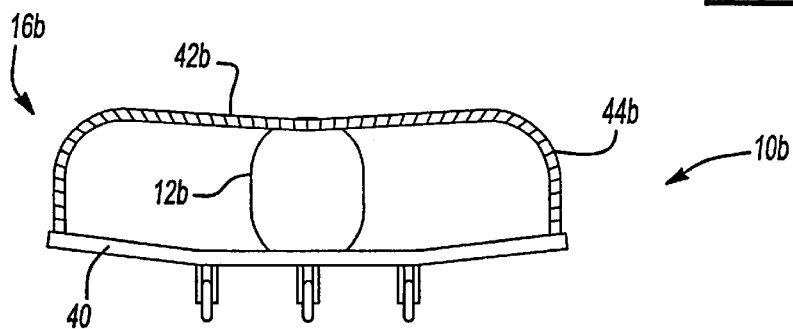
FIG. 9 is a rear elevation view of still another air vehicle constructed in accordance with the teachings of the present invention.
Figure 10:
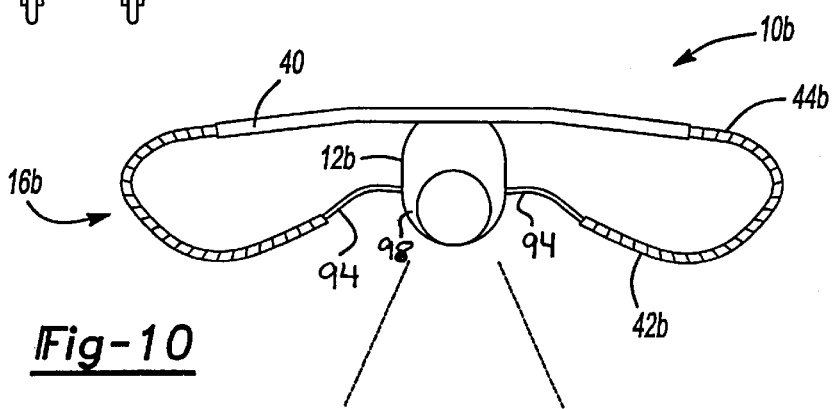
FIG. 10 is a rear elevation view similar to FIG. 9 but illustrating the air vehicle with the fuselage doors in an open condition.

FIGS. 9 and 10 illustrate yet another exemplary air vehicle 10b. The air vehicle 10b is configured with an arch wing assembly 16b that is substantially similar to the arch wing assembly 16a, except that the interconnecting portions 44b and the upper wing 42b are flexibly coupled to the lower wing 40 and the fuselage 12b. Accordingly, when the air vehicle 10b exits the Earth's atmosphere and enters a desired orbit, a pair of doors 94 that are hingedly coupled to the body 98 of the fuselage 12b at a first end and coupled (either flexibly or pivotably) to the upper wing 42b at a second end, may be opened (FIG. 10) to release a payload (not shown) from the payload compartment 28. The arch wing assembly 16b provides the air vehicle 10b with the aforementioned advances in lift and maneuverability, but due to its flexible nature, does not restrict the opening or placement of the doors 94.

Figure 11:
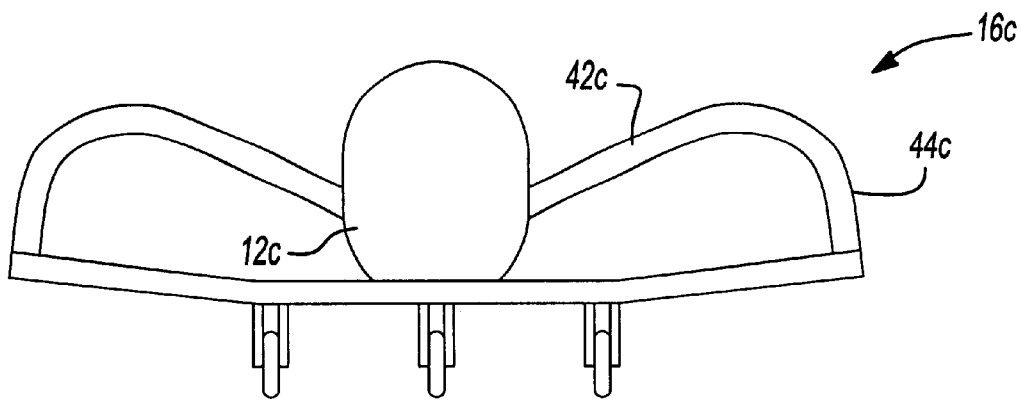
FIG. 11 is a rear elevation view of a yet another air vehicle constructed in accordance with the teachings of the present invention.
Figure 12:
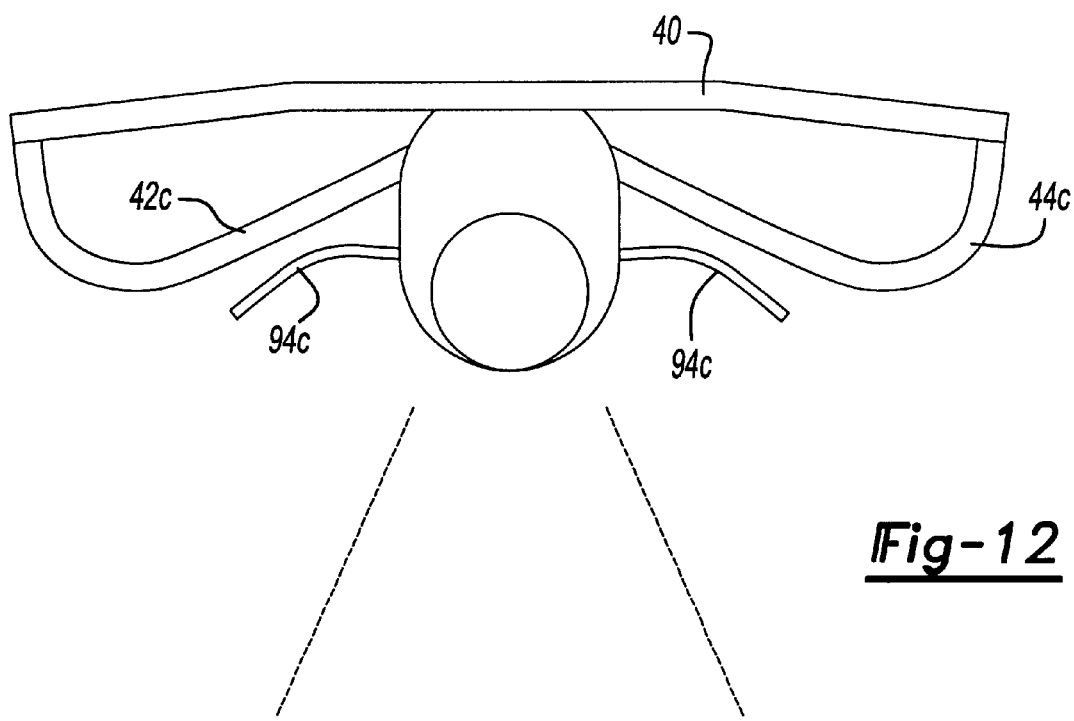
FIG. 12 is a rear elevation view similar to FIG. 11 but illustrating the air vehicle with the fuselage doors in an open condition.

The embodiment of FIGS. 11 and 12 is similar to that of FIGS. 9 and 10, except that the arch wing assembly 16c is configured with a rigid interconnecting portion 44c and a rigid upper wing 42c that is fixed to the fuselage 12c at a point below the point where the doors 94c are pivotably coupled to the fuselage 12c.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An air vehicle comprising:
an elongated body structure having an aft portion;
a conformal steering device coupled to the body structure;
an arch wing device coupled to the aft portion of the body structure, the arch wing device including:
a lower wing having a sweptback leading edge and a sweptback trailing edge;
an upper wing having a swept back leading edge and a swept back trailing edge, wherein the upper wing is disposed above and at least partially overlaps the lower wing; and
a pair of interconnecting portions, each of the interconnecting portions coupling an outboard lateral edge of the upper wing to an associated outboard lateral edge of the lower wing, and
wherein the steering device includes a pair of panels including apertures, the apertures positioned on an associated panel to be adjacent to the body structure and operable to permit a boundary layer of air to propagate through the associated panel.

2. The air vehicle of claim 1, wherein the upper wing is generally parallel to the lower wing.

3. The air vehicle of claim 1, wherein each interconnecting portion includes an arcuate portion that intersects the outboard lateral edge of the upper wing.

4. The air vehicle of claim 3, wherein each interconnecting portion intersects the lower wing in a generally perpendicular manner.

5. The air vehicle of claim 1 wherein the body structure has a pair of opposite sides and the panels are each coupled to one of the opposite sides of the body structure, the panels being selectively movable relative to the body structure to affect a lateral steering of the air vehicle when the air vehicle is in flight.

6. The air vehicle of claim 5, wherein each of the panels is pivotably coupled to the body structure.

7. The air vehicle of claim 1, wherein the lower wing includes a plurality of control surfaces for affecting a vertical attitude of the air vehicle when the air vehicle is in flight.

8. The air vehicle of claim 7, wherein the control surfaces include a plurality of elevons.

9. The air vehicle of claim 1, wherein a nose is coupled to an end of the body structure opposite the aft portion.

10. The air vehicle of claim 9, wherein the nose is movably coupled to the body structure.

11. The air vehicle of claim 1, wherein the lower wing is tangent to a lower surface of the body structure.

12. The air vehicle of claim 11, wherein the upper wing is tangent to an upper surface of the body structure.

13. An air vehicle comprising:
an elongated body structure having an aft portion and a pair of opposite lateral sides;
an arch wing device coupled to the aft portion of the body structure, the arch wing device including:
a lower wing having a swept back leading edge, a swept back trailing edge and a plurality of elevon control surfaces, the lower wing being tangent to a bottom surface of the body structure;
a upper wing having a swept back leading edge and a swept back trailing edge; and
a pair of interconnecting portions, each of the interconnecting portions coupling an outboard lateral edge of the upper wing to an associated outboard lateral edge of the lower wing; and
a conformal steering device that is coupled to the body structure forward of the arch wing device, the conformal steering device including a pair of panels that are pivotably coupled to the opposite lateral sides of the body structure, the panels being selectively movable relative to the body structure to affect at least one of a lateral steering, a pitch and a trim of the air vehicle when the air vehicle is in flight, each of the panels including an aperture that is positioned on an associated panel to be adjacent the body structure when the panel is in a deployed condition to permit a boundary layer of air to propagate through the associated panel.

14. An air vehicle comprising:
an elongated body structure having an aft portion; and
an arch wing device coupled to the aft portion of the body structure, the arch wing device including:
a lower wing having a sweptback leading edge and a sweptback trailing edge;
a upper wing having a swept back leading edge and a swept back trailing edge;
a pair of interconnecting portions, each of the interconnecting portions coupling an outboard lateral edge of the upper wing to an associated outboard lateral edge of the lower wing;
a conformal steering device that is coupled to the body structure;
wherein the body structure has a pair of opposite sides and the conformal steering device includes a pair of panels each of which being coupled to one of the opposite sides of the body structure, the panels being selectively movable relative to the body structure to affect a lateral steering of the air vehicle when the air vehicle is in flight; and
wherein each of the panels includes an aperture, each of the apertures being positioned on an associated panel to be adjacent the body structure when the panel is in a deployed condition to permit a boundary layer of air to propagate through the associated panel.

* * * * *